(12) United States Patent
Chen et al.

(10) Patent No.: US 11,461,451 B2
(45) Date of Patent: Oct. 4, 2022

(54) DOCUMENT SIGNING SYSTEM FOR MOBILE DEVICES

(71) Applicant: VMWARE, INC., Palo Alto, CA (US)

(72) Inventors: Lucas Chen, Atlanta, GA (US); Gaurav Arora, Atlanta, GA (US); Evan Hurst, Atlanta, GA (US); Nicholas Grivas, Atlanta, GA (US); Nicholas Brouillette, Atlanta, GA (US); Jubin Benny, Bangalore (IN); Jason Ruby, Johns Island, SC (US); Eugene Liderman, Olney, MD (US); Hemant Sahani, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 345 days.

(21) Appl. No.: 16/537,651

(22) Filed: Aug. 12, 2019

(65) Prior Publication Data
US 2020/0412553 A1 Dec. 31, 2020

(30) Foreign Application Priority Data
Jun. 25, 2019 (IN) .............................. 201941025151

(51) Int. Cl.
*G06F 21/33* (2013.01)
*H04L 9/32* (2006.01)
*H04L 9/00* (2022.01)

(52) U.S. Cl.
CPC .............. *G06F 21/33* (2013.01); *H04L 9/006* (2013.01); *H04L 9/3226* (2013.01); *H04L 9/3268* (2013.01)

(58) Field of Classification Search
CPC ....................................................... G06F 21/33
See application file for complete search history.

(56) References Cited

U.S. PATENT DOCUMENTS

| | | | |
|---|---|---|---|
| 6,745,327 B1 | 6/2004 | Messing | |
| 7,178,030 B2 | 2/2007 | Scheidt et al. | |
| 7,484,089 B1 | 1/2009 | Kogen et al. | |
| 7,640,427 B2 | 12/2009 | Callas et al. | |
| 8,316,237 B1 | 11/2012 | Felsher et al. | |
| 8,844,024 B1 | 9/2014 | Graf et al. | |

(Continued)

FOREIGN PATENT DOCUMENTS

KR 101853610 B1 5/2018

OTHER PUBLICATIONS

Zhu, Wen-Tao; Lin, Jingqiang. Generating Correlated Digital Certificates: Framework and Applications. IEEE Transactions on Information Forensics and Security, vol. 11, Issue: 6. https://ieeexplore.ieee.org/stamp/stamp.jsp?tp=&arnumber=7378493 (Year:2016).

(Continued)

*Primary Examiner* — Bradley W Holder
(74) *Attorney, Agent, or Firm* — Thomas | Horstemeyer, LLP

(57) ABSTRACT

Disclosed are various approaches for signing documents using mobile devices. A request is sent to a certificate authority for a signing certificate. The signing certificate is then received from the certificate authority. The signing certificate is then stored in the memory. Next, a file is received from a client application executed by the processor of the computing device. Then, the file is signed with the signing certificate to create a signed file. The signed file is then returned to the client application.

20 Claims, 8 Drawing Sheets

(56) References Cited

U.S. PATENT DOCUMENTS

| | | |
|---|---|---|
| 9,313,032 B2 | 4/2016 | Oswalt |
| 9,736,145 B1* | 8/2017 | Hayes ................ H04L 63/0846 |
| 2002/0059144 A1 | 5/2002 | Meffert et al. |
| 2002/0178370 A1 | 11/2002 | Gurevich et al. |
| 2003/0079124 A1 | 4/2003 | Serebrennikov |
| 2008/0098214 A1* | 4/2008 | Rodriguez Martinez .................... H04L 9/3268 713/176 |
| 2014/0164776 A1 | 6/2014 | Hook et al. |
| 2015/0222604 A1 | 8/2015 | Ylonen |
| 2015/0350195 A1* | 12/2015 | Vangara ............. H04L 63/0823 726/10 |
| 2017/0279607 A1* | 9/2017 | Kent .................... H04W 12/37 |
| 2017/0279618 A1* | 9/2017 | Kent ...................... H04L 9/006 |
| 2017/0279784 A1* | 9/2017 | Kent ..................... H04L 9/3265 |
| 2017/0279785 A1* | 9/2017 | Kent ....................... H04L 9/12 |
| 2019/0253254 A1 | 8/2019 | Brownlee et al. |
| 2020/0099534 A1 | 3/2020 | Lowagie |

OTHER PUBLICATIONS

Hu, Weixiong, Chang, Jieju. Design and Implementation of the Internet Real-Name Authentication System Based on Public Key Infrastructure. 2010 International Conference on Management and Service Science. https://ieeexplore.ieee.org/stamp/stamp.jsp?tp=&arnumber=5578416 (Year: 2010).

* cited by examiner

DOCUMENT SIGNING SYSTEM FOR MOBILE DEVICES

RELATED APPLICATIONS

Benefit is claimed under 35 U.S.C. 119(a)-(d) to Foreign Application Serial No. 201941025151 filed in India entitled "DOCUMENT SIGNING SYSTEM FOR MOBILE DEVICES", on Jun. 25, 2019, by VMware, Inc., which is herein incorporated in its entirety by reference for all purposes The present application is related in subject matter to U.S. patent application Ser. No. 16/537,653, which is incorporated herein by reference.

Many large organizations require documents to be signed by an authorized individual prior to a related action being performed. For example, procurement orders may need to be signed by a manager before items can be purchased, leave or vacation requests may need to be signed by a supervisor, information technology (IT) change requests may need to be authorized by an engineer, etc. Electronic documents can be signed electronically on a computer. However, mobile devices often lack support for the same electronic signature options that are available on a personal computer. For instance, some options for two-factor or multi-factor authentication are generally not supported or available on a mobile device, preventing their use for electronically signing documents on a mobile device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for signing electronic documents on clients such as devices. Users can open and review documents on their devices. If desired, a user can also sign the documents using trusted digital certificates. The trusted digital certificates can be derived from user credentials, such as a cryptographic token generated by a smart card or similar hardware security device. The trusted digital certificates can then be provided to clients associated with the user when a user attempts to sign a document. Revocation or expiration of the trusted digital certificates can be used to enforce signing privileges, such as when an employee leaves an organization. In the following discussion, a general description of the system and its components is provided, followed by a discussion of the operation of the same.

Figure 1A:
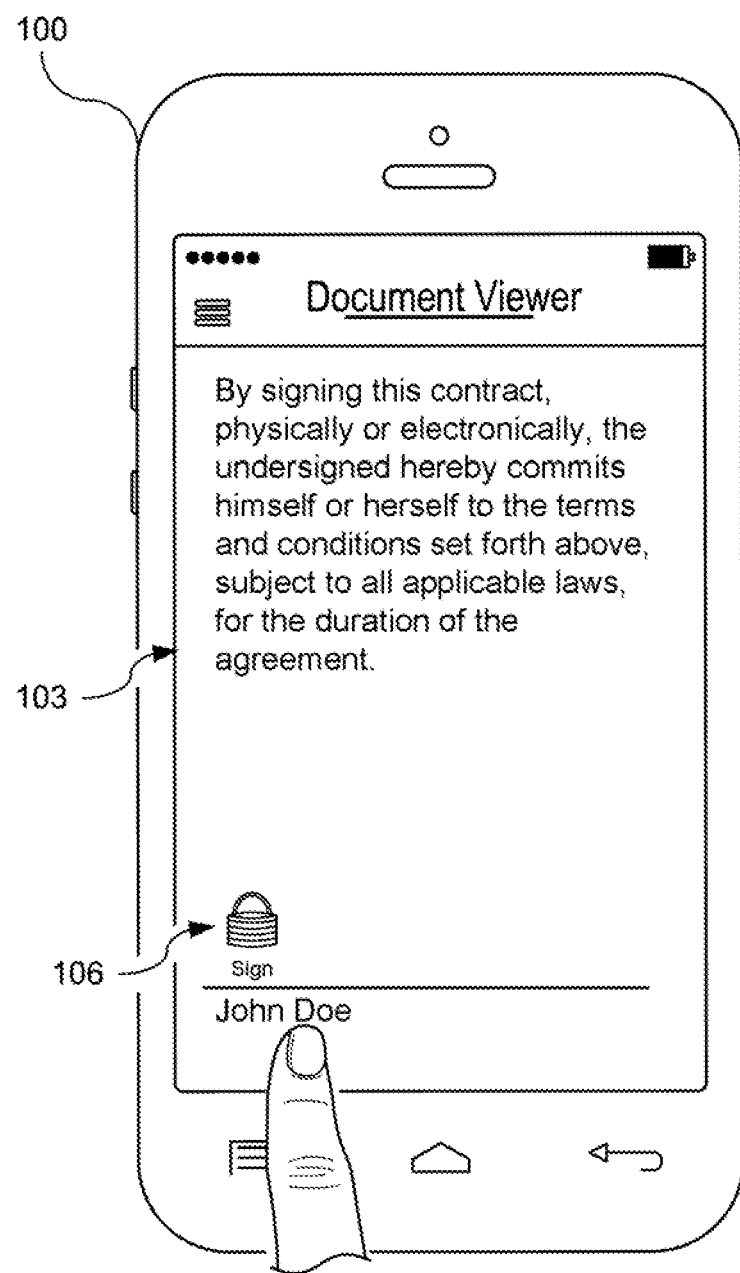
FIG. 1A is a drawing of a client device according to various implementations of the present disclosure.

To begin, FIG. 1A depicts a client device 100 with a display 103 that can render a user interface. As depicted, a user is able to view a document on the display 103 of a client device 100. With the user interface, a user can interact with a user interface element 106 to electronically sign the document. The electronic signature can include an electronic acknowledgement of assent to or approval of the content of the document and can involve cryptographic operations to provide for authentication and non-repudiation of the electronic signature and verification of the document signed.

Figure 1B:
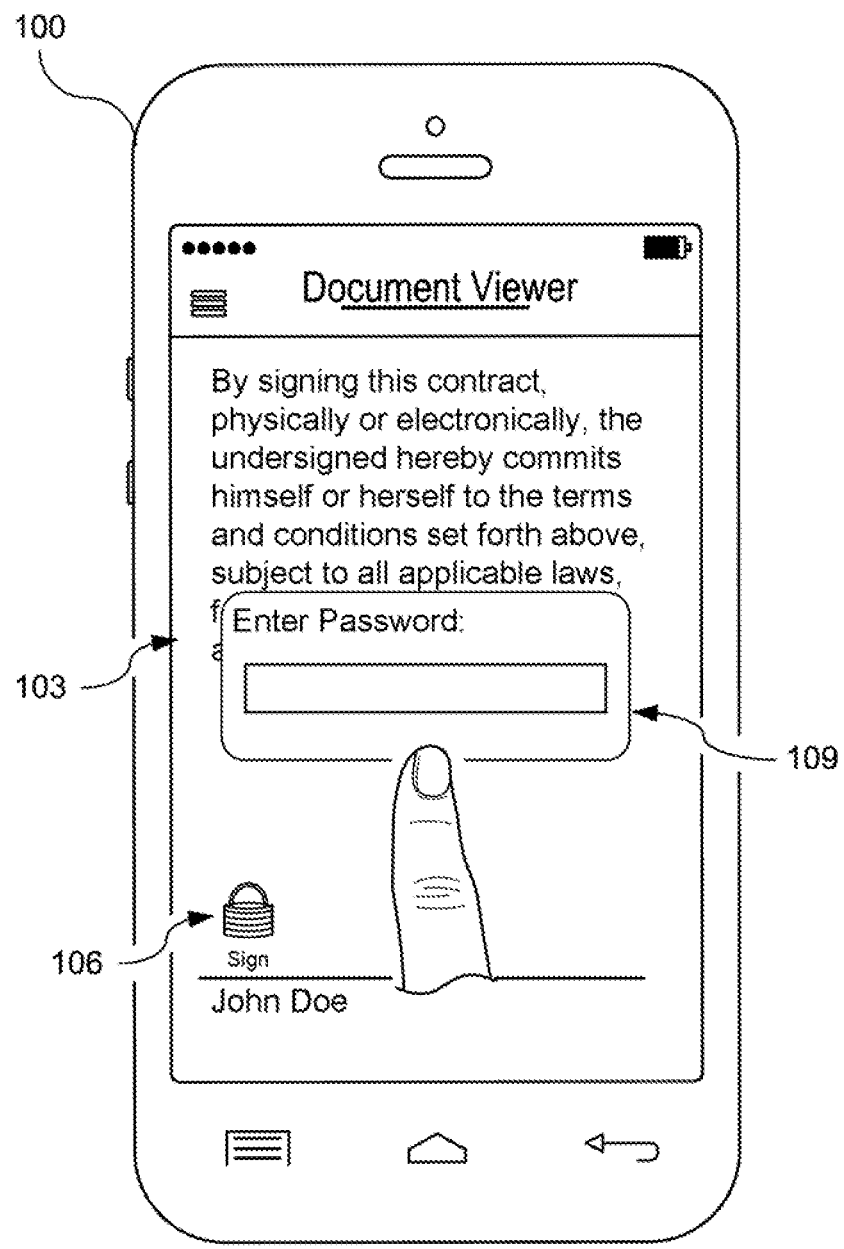
FIG. 1B is a drawing of a client device according to various implementations of the present disclosure.

FIG. 1B provides an example illustration of the user experience of electronically signing a document on a mobile device. After interacting with the user interface element 106, a prompt 109 can be rendered within the user interface. The prompt 109 can be used to allow for a user to authenticate himself or herself with the client device 100 in order to verify that the user attempting to electronically sign the document is the authorized signatory. In some implementations, the prompt 109 may be configured to allow the user to input a password, personal identification number (PIN), or similar authorization code. However, the prompt 109 may also be configured to allow the input to provide a biometric identifier (e.g., a prompt 109 instructing the user to use a fingerprint reader or look at a camera for facial recognition), cryptographic value generated from a hardware security token (e.g., a universal second factor (U2F) authentication token, a smart card, etc.) select a key-file, or input some other credential.

Figure 1C:
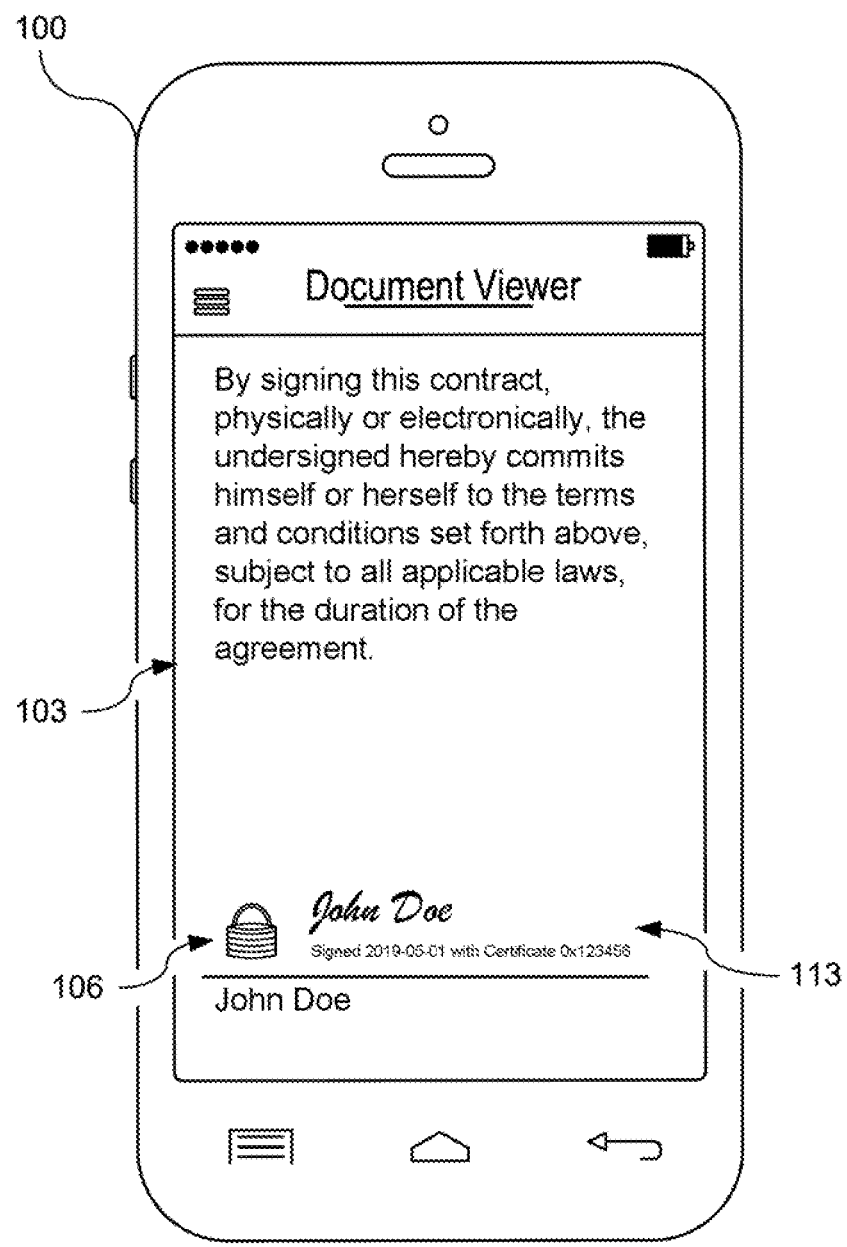
FIG. 1C is a drawing of a client device according to various implementations of the present disclosure.

An example of a result is depicted in FIG. 1C, where an electronic signature 113 that has been appended to or inserted into the document is rendered on the display 103. The electronic signature 113 can include a graphical or similar digital representation of the user's signature. The electronic signature 113 can also include information such as the date the document was signed, an identifier of a certificate that was used to sign the document, and potentially other information.

Figure 2:
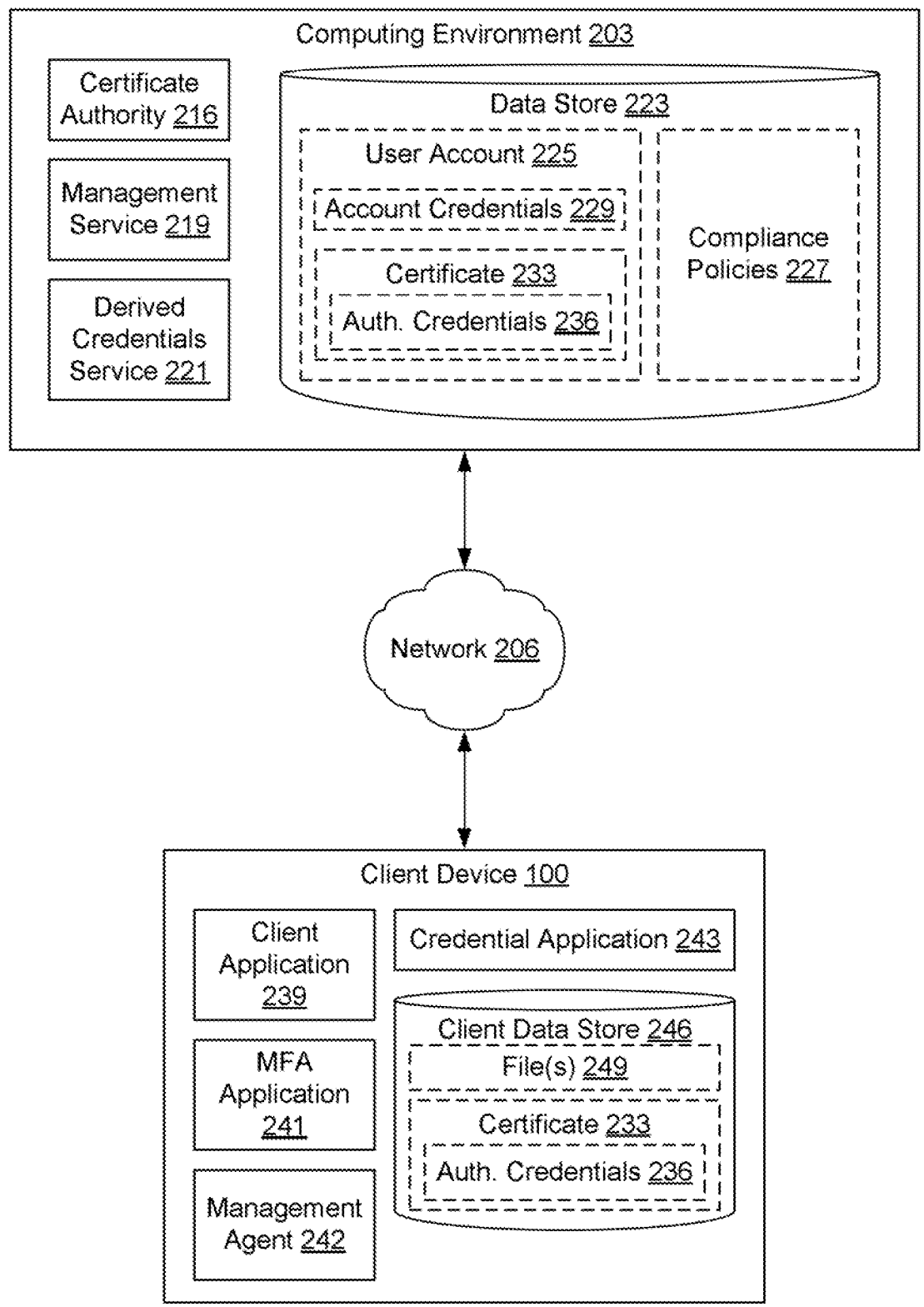
FIG. 2 is a drawing of a network environment according to various implementations of the present disclosure.

With reference to FIG. 2, shown is a network environment 200 according to various embodiments. The network environment 200 includes a computing environment 203 and a client device 100, which are in data communication with each other via a network 206. The network 206 can include wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 206 can also include a combination of two or more networks 206. Examples of networks 206 can include the Internet, intranets, extranets, virtual private networks (VPNs), and similar networks.

The computing environment 203 can include a server computer or any other system providing computing capability. Alternatively, the computing environment 203 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource or any other distributed computing arrangement. In some cases, the computing environment 203 can correspond to an elastic computing resource where the allotted capacity of processing, network, storage, or other computing-related resources can vary over time.

Various applications or other functionality can be executed in the computing environment 203 according to various embodiments. The components executed on the computing environment 203 can include a certificate authority 216, a management service 219, a derived credentials service 221, as well as other applications, services, processes, systems, engines, or functionality.

Also, various data is stored in a data store 223 that is accessible to the computing environment 203. The data store 223 can be representative of a plurality of data stores 223, which can include relational databases, object-oriented databases, hierarchical databases, hash tables or similar key-value data stores, as well as other data storage applications or data structures. The data stored in the data store 223 is associated with the operation of the various applications or functional entities described below. This data can include user accounts 225, compliance policies 227, and potentially other data.

A user account 225 represents a user of a client device 100 that is registered or enrolled with the management service 219. This can include a user who is viewing and electronically signing documents in various implementations of the present disclosure. The user account 225 can include account credentials 229, a certificate 233, and potentially other data.

The account credentials 229 represent the authentication factors used to verify the identity of a user. Examples of account credentials 229 include passwords or passcodes, one-time codes generated by an application, cryptographic keys or certificates, or authentication tokens generated by hardware security devices previously identified as being associated with a user.

The certificate 233 is an electronic document which identifies the owner of a respective cryptographic key, such as a public encryption key-pair or a symmetric encryption key. The cryptographic key associated with the certificate may be used to encrypt or decrypt data, as well as perform cryptographic or digital signature operations. The certificate 233 may include information about the key (e.g., a fingerprint of the key and the type of encryption key), the user account 225 for which the key is assigned, and a digital signature by an entity that has verified the contents of the certificate 233.

In some implementations, a certificate 233 can also include authentication credentials 236 which a user can provide to verify that the user is allowed to utilize the certificate 233. For instance, the authentication credentials 236 could include a password or passphrase required to decrypt the certificate 233, such as a password or passphrase used to access certificates 233 stored in a Public-Key Cryptography Standards version 12 (PKCS #12) formatted file. As another example, the authentication credentials 236 could include a password, passphrase, authentication code or token, encryption key, or similar data that the certificate authority 216 may request prior to providing a certificate 233 in response.

A compliance policy 227 represents a definition of a required state or configuration of the client device 100. The compliance policy 227 may also specify one or more remedial actions to be performed if the client device 100 is not in the required state or match the required configuration specified by the compliance policy 227. For example, a compliance policy 227 may specify that particular applications cannot be executed at specified times of day or in specified locations defined by a geofence. As another example, a compliance policy 227 may specify that the client device 100 cannot access specified types of data (e.g., particular documents or types of documents) at specified locations defined by a geofence. Similarly, a compliance policy 227 may specify that a certificate 233 cannot be installed on the client device 100 if the client device 100 is located within a specified geofence. Accordingly, such a compliance policy 227 may specify a remedial action that the certificate 233 be deleted from the client device 100 when it enters the specified geofence. Various other compliance policies 227 may be specified by administrators as appropriate for individual users, client devices 100, or enterprises.

The certificate authority 216 is executed to issue and validate cryptographic certificates 233. For example, the certificate authority 216 can issue certificates 233 to services or devices in response to a request for a certificate 233. The certificate authority 216 can also validate the authenticity of certificates 233 that have been issued by the certificate authority 216 (e.g., to evaluate whether the certificate 233 is a forgery, the certificate 233 has been revoked, etc.). For example, the certificate authority 216 can issue a certificate 233 for a user account 225 in response to request from the derived credentials service 221.

The management service 219 is executed to monitor and control the operation of enrolled client devices 100 through the use of compliance policies 227. For example, the management service 219 may send one or more commands to a client device 100 to bring the client device 100 into a compliant state with respect to a compliance policy 227. Similarly, the management service 219 could provide copies of applicable compliance policies 227 to the client device 100 for enforcement by a locally executing agent.

The derived credentials service 221 is executed to generate or request the creation of derived credentials on behalf of the user account 225. In order to protect the account credentials 229 from third-party services, a user may wish for a substitute credential derived from the account credentials 229 to be used. Similarly, where one type of account credential 229 may be impractical to use, a user may wish for a substitute credential derived from the account credentials 229 to be used in its place. For example, a one-way hash of a password may be used in place of the password itself to obfuscate the password. As another example, smart cards may be unavailable for authentication by users when using a mobile device (e.g., a smartphone). Accordingly, a user may wish for a certificate 233 to be issued and stored on the client device 100 for use as a substitute to the smart card for authentication purposes.

The client device 100 is representative of a plurality of client devices that can be coupled to the network 206. The client device 100 can include any computer system, such as a personal computer (e.g., a desktop computer, a laptop computer, or similar device) or a mobile computing device (e.g., personal digital assistants, cellular telephones, smartphones, web pads, tablet computer systems, music players, portable game consoles, electronic book readers, and similar devices). The client device 100 can include one or more displays 103, such as liquid crystal displays (LCDs), gas plasma-based flat panel displays, organic light emitting diode (OLED) displays, electrophoretic ink ("E-ink") displays, projectors, or other types of display devices. In some instances, the display 103 can be a component of the client device 100 or can be connected to the client device 100 through a wired or wireless connection.

The client device 100 can be configured to execute various applications such as a client application 239, a multifactor authentication application 241, a management agent 242, a credential application 243, or other applications. The client device 100 can also include a client data store 246, which can be representative of a plurality of client data stores 246, including relational databases, object-oriented databases, hierarchical databases, hash tables or similar key-value data stores, as well as other data storage applications or data structures. The data stored in the client data store 246 is associated with the operation of the various applications or functional entities described below. This data can include files 249, certificates 233, and potentially other data. In some embodiments, multiple client data stores 246 may be used by the client device 100 to provide for secure separation of data. For instance, a first client data store 246 may be used to securely store certificates 233 (e.g., a password or credential management system), while other client data stores 246 may be used to store other types of data, such as files 249.

The client application 239 can be executed in a client device 239 to access network content served up by the computing environment 203 or other servers, thereby rendering a user interface on the display 103. Examples of a client application 239 include a web browser, an email application, a messaging or chat application, a document viewer, a file browser, social networking application, word processors, spreadsheets, etc. The user interface can include a network page, an application screen, or other user mechanism for obtaining user input.

The multifactor authentication application 241 can be executed to allow a user to input additional authentication factors when logging onto the client device 100 or a service accessible across the network 206 (e.g., a single sign-on (SSO) portal, a login screen or page for an application, etc.). For example, the multifactor authentication application 241 may be configured to allow a user to submit an authentication token generated by a smart card or similar device in data communication with the client device 100 when his or her account credentials 229 are requested. As another example, the multifactor authentication application 241 may be configured to generate numeric or alphanumeric codes at periodic intervals or in a pseudorandom sequence derived from an initial seed value. These codes could then be inputted or submitted as an account credential 229 for authenticating a user.

The management agent 242 can be executed to register or enroll the client device 100 with the management service 219 and to implement or enforce applicable compliance policies 227. For example, the management agent 242 may be configured to regularly contact the management service 219 to provide status updates on the operation, state, or configuration of the client device 100 and retrieve commands from the management service 219 to implement in order to bring the client device 100 into compliance with an applicable compliance policy 227. As another example, the management agent 242 may be configured to retrieve compliance policies 227 from the management service 219 and implement or enforce the compliance policies 227 on the client device 100.

The credential application 243 can be executed, in some implementations, to provide electronic and cryptographic signing functions for client applications 239 installed on the client device 100. In some implementations, the functionality of the credential application 243 may be implemented as a library that can be incorporated into a client application 239 (e.g., as part of a software development kit (SDK)). In other implementations the credential application 243 may be implemented as an independent service or application.

Next, a general description of the operation of the various components of the network environment 200 is provided. Although the following general description illustrates how the various components of the network environment 200 can interoperate with each other, more detailed descriptions of the operation and interaction between the various components is provided in the discussion of FIGS. 3-6.

To begin, the derived credentials service 221 can cause one or more derived credentials, such as certificates 233, to be created on behalf of a user. For example, when a user logs onto his or her computer (e.g., a laptop, desktop, etc.), the user may be prompted to provide multiple account credentials 229. The first account credential 229 could be a password associated with the user account 225, while a second authentication credential 229 could be a cryptographic token generated by a hardware security device (e.g., a smart card, U2F security token, biometric reader, etc.) in data communication with the user's laptop or desktop. As many hardware security devices cannot be used with mobile devices, the derived credentials service 221 can cause a certificate 233 to be generated for use on mobile devices in place of a hardware security device associated with the user.

To generate the certificate 233, the derived credentials service 221 can create a public-key pair based off of the cryptographic token generated by the hardware security device. For example, the derived credentials service 221 could use the cryptographic token as an initial seed value for a pseudorandom number generator serving as an entropy source for the creation or selection of the public-key pair. However, in some instances, the derived credentials service 221 can alternately generate the public-key pair in response to receipt of the account credentials 229 authenticating the user. In these instances, the public-key pair would be subsequently stored in a certificate 233 linked with the user account 225.

Once the derived credentials service 221 generates the public-key pair, the derived credentials service 221 sends a request to the certificate authority 216 to generate or issue a certificate for the user account 225. The request can include the public-key pair created by the derived credentials service and identifying information from the user account 225. The certificate authority 216 can then generate and issue the certificate 233, and provide it to the derived credentials service 221 in response. In some implementations, the certificate authority 236 may secure the certificate 233 by linking authentication credentials 236 to the certificate 233. For example, the certificate authority 233 could encrypt the certificate 233 with authentication credentials 236 (e.g., a password or PIN). In order to use the certificate 233, a user would have to decrypt the certificate 233 using the appropriate authentication credentials 236. As another example, the certificate authority 233 could link authentication credentials 236 to the certificate 233, which would require the user to supply the appropriate authentication credentials 236 to access the certificate 233.

The certificate 233 can then be provided to the client device 100 for use in electronically signing files 249, such as documents. For example, when a client application 239 attempts to electronically sign a file 249, the credential application 243 may authenticate the user of the client device 100 and retrieve the certificate 233. The credential application 243 may then use the certificate to electronically sign the file 249, as discussed in detail later.

Figure 3:
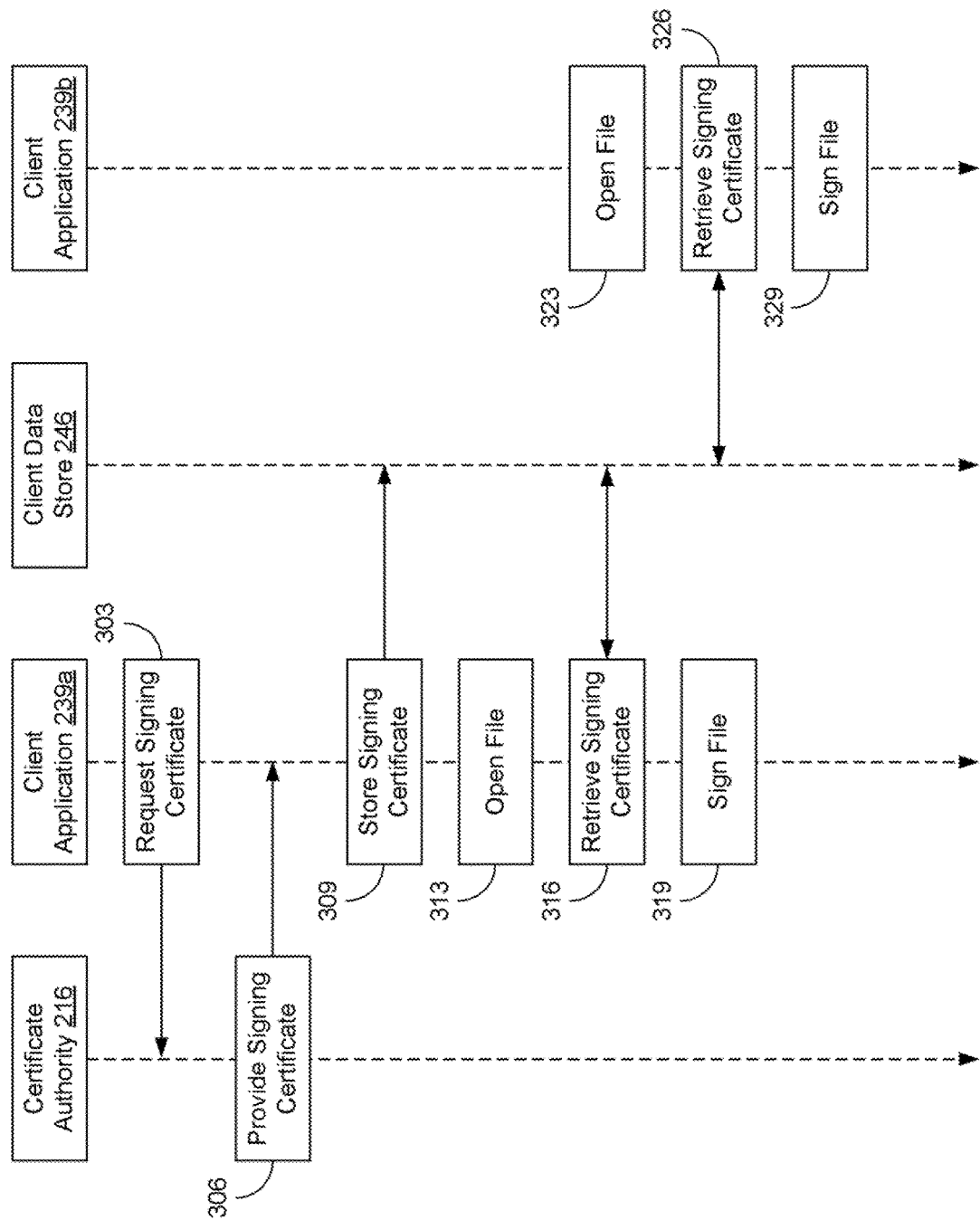
FIG. 3 is a sequence diagram illustrating one example of an implementation of the present disclosure within the network environment of FIG. 2

Referring next to FIG. 3, shown is a sequence diagram that provides one example of the interaction between the various components of the network environment 200. The sequence diagram of FIG. 3 provides merely an example of a possible implementation of the present disclosure, whereby the functionality of the credential application 243 is included as part of a client application 239. This can occur, for example, when the credential application 243 is provided as a library of an SDK which is utilized by the client application(s) 239 installed on the client device 100. As an alternative, the flowchart of FIG. 3 can be viewed as depicting an example of elements of a method implemented in the network environment 200 according to one or more embodiments.

Beginning at step 303, a first client application 239a sends a request to the certificate authority 216 for a signing certificate 233. The request can include an identifier of the user account associated with the client device 100 in order to allow the certificate authority 216 to provide the appropriate certificate 233 in response. The request may be sent when the first client application 239a is first installed on the client device 100. As another example, the request may also be sent in response to a determination by the first client application 239a that the certificate 233 is absent from the memory of the client device 100. This could occur, for example, when the certificate 233 has not been previously used for electronically signing documents or files 249 or when a previously used certificate 233 has expired or been revoked and a new certificate 233 is required.

In some implementations, the request can include authentication credentials 236 to allow the first client application 239a to verify with the certificate authority 216 that the first client application 239a is authorized to receive the certificate 233. For example, the first client application 239a could cause a prompt 109 to be rendered on the display 103 of the client device 100. The user could input his or her authentication credentials 236 into the prompt.

Then at step 306, the certificate authority 216 provides the certificate 233 in response. In some implementations, the certificate authority 216 may first verify that the authentication credentials 236 included in the request for the certificate 233 match the authentication credentials 236 recorded in association with the certificate 233. If the certificate 233 has not yet been created, the certificate authority 216 may create the certificate 233 prior to providing the certificate 233 to the first client application 239a.

Moving on to step 309, the first client application 239a can optionally store the retrieved certificate 233 in the client data store 246. For example, if the certificate 233 has not been previously used or requested by the client device 100, then the first client application 239a can store the retrieved certificate 233 in the client data store 246 for use by other client applications 239.

Next at step 313, the first client application 239a can open a file 249 stored in the client data store 246. This can occur, for example, when a user wishes to view or edit a file 249 using the first client application 239a. Examples can include a user attempting to view a portable document format (PDF) file 249 attached to an email, a user opening a file 249 stored in a network accessible file repository or content locker, a user opening a locally stored file 249, or similar file operations.

Then at step 316, the first client application 239a can retrieve the certificate 233 from the client data store 246. This may be done, for example, in response to a manipulation of a user interface element 106 rendered on the display 103 of the client device 100 designed to allow a user to electronically sign the file 249.

Moving onto step 319, the first client application 239a can then electronically sign the file 249. For example, the first client application 239a could insert a graphical representation of the user's signature into the document. In addition, the first client application 239a could also cryptographically sign the file 249 utilizing the certificate 233 and insert the digital signature into the file 249 along with additional information to allow the signature to be authenticated, verified, and irrefutable.

In some implementations, the first client application 239a may convert the file 249 from a first file type to a second file type prior to signing the file 249. For example, some types of files (e.g., a portable document file (PDF)) may natively support electronic or digital signatures, while other file types (e.g., plaintext files) may not. In such an example, the first client application 239a could first convert the plaintext file 249 into a PDF file 249 prior to signing the file 249.

Once the certificate 233 has been stored in the client data store 246 by the first client application 239a, other client applications 239 that incorporate the functionality of the credential application 243 (e.g., other client applications 239 that link to the same SDK as the first client application 239a) can also use the certificate 233 to electronically sign other files or documents. For example, at steps 323, 326, and 329, a second client application 239b could open a file 249, retrieve the same certificate 233 stored by the first client application 239a, and use the certificate 233 to electronically sign files 249 or documents on behalf of a user.

Figure 4:
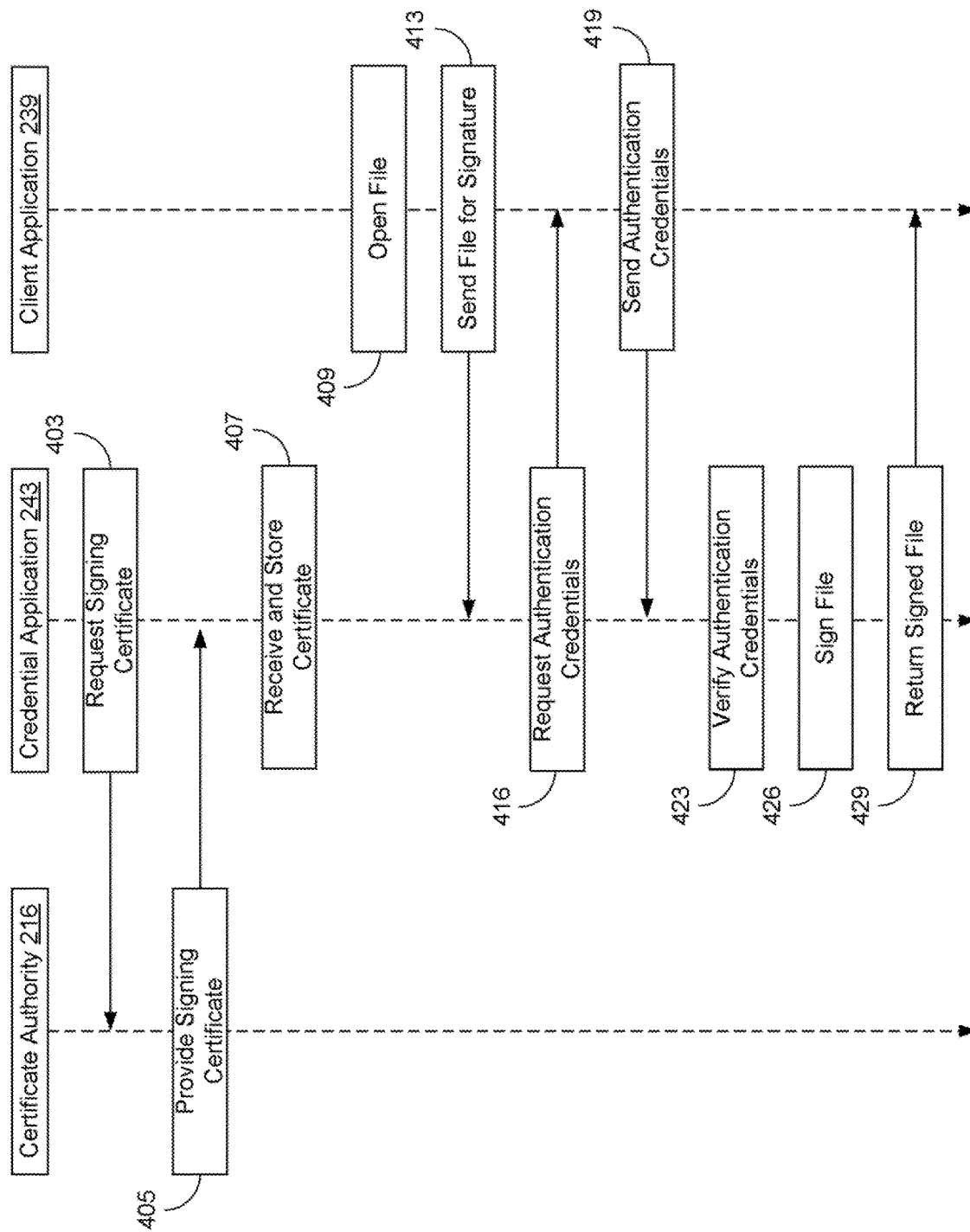
FIG. 4 is a sequence diagram illustrating one example of an implementation of the present disclosure within the network environment of FIG. 2

Referring next to FIG. 4, shown is a sequence diagram that provides one example of the interaction between the various components of the network environment 200. The sequence diagram of FIG. 4 provides merely an example of a possible implementation of the present disclosure. As an alternative, the flowchart of FIG. 4 can be viewed as depicting an example of elements of a method implemented in the network environment 200 according to one or more embodiments.

Beginning at step 403, the credential application 243 sends a request to the certificate authority 216 for a certificate 233 for use for electronically signing files 249 or documents. The request might be sent, for example, when a client device 100 is first registered with the management service 219 or when a previous certificate 233 has expired or been revoked. The request can include an identifier of the user account associated with the client device 100 in order to allow the certificate authority 216 to provide the appropriate certificate 233 in response.

Next at step 405, the certificate authority 216 provides the requested certificate 233 in response. If necessary, the certificate authority 216 may generate the certificate 233 at this stage. This can occur, for example, if a valid certificate 233 has not been previously created or if a previous certificate 233 has expired but not yet been replaced or reissued. At respective step 407, the credential application 243 receives the certificate 233 and stores it in the client data store 246 for subsequent use.

Then at step 409, a client application 239 opens a file 249. This may occur, for example, when a user of the client device 100 uses the client application 239 to view or edit a file 249 on the client device 100.

Subsequently at step 413, the client application 239 sends the file 249 to the credential application 243 to be electronically signed. This can occur, for example, when a user manipulates a user interface element 106 rendered on the display 103 of the client device to electronically sign the file 249.

Next at step 416, the credential application 243 may optionally request authentication credentials 236 associated with the certificate 233 from the client application 239. This may be done, for example, to authenticate or otherwise verify that the user of the client device 100 is authorized to utilize the certificate 233 to electronically sign the file 249.

Then at step 419, the client application 239 can obtain the authentication credentials 236 from the user and send the authentication credentials 236 to the credential application 243. For example, the client application 239 could cause a prompt 109 to be rendered on the display 103 of the client device 100. The user could input his or her authentication credentials 236, such as a password or personal identification number (PIN), into the prompt. The authentication credentials 236 could then be sent to the credential application 243.

Subsequently at step 423, the credential application 243 can verify the authentication credentials 236 received from the client application 239. For example, the credential application 243 could compare the received authentication credentials 236 with the authentication credentials 236 stored in association with the certificate 233. If the two sets of authentication credentials 236 match, then the user of the client device 100 is permitted to utilize the certificate 233. As another example, if the authentication credentials 236 received from the client application 239 are able to successfully decrypt the certificate (e.g., where the certificate is encrypted within a PKCS #12 container), then the credential application 243 could determine that the user of the client device 100 is permitted to utilize the certificate 233.

Next at step 426, the credential application 243 signs the file 249. For example, the credential application 243 could insert a graphical representation of the user's signature into the file 249. Further, the credential application 243 could use the certificate 233 to generate a cryptographic signature of the file 249 and include information about the certificate 233 used to generate the cryptographic signature of the file 249 in the file 249. This additional information could include a fingerprint or similar unique identifier of the certificate 233, the date and time that the cryptographic signature for the file 249 was generated, and potentially other information.

In some implementations, the credential application 243 may first convert the file 249 from a first file type to a second file type prior to signing the file 249. For example, some types of files (e.g., a portable document file (PDF)) may natively support electronic or digital signatures, while other file types (e.g., plaintext files) may not. In such an example, the credential application 243 could first convert the plaintext file 249 into a PDF file 249 prior to signing the file 249.

Finally, at step 429, the credential application 243 can then return the signed file 249 to the client application 239.

Figure 5:
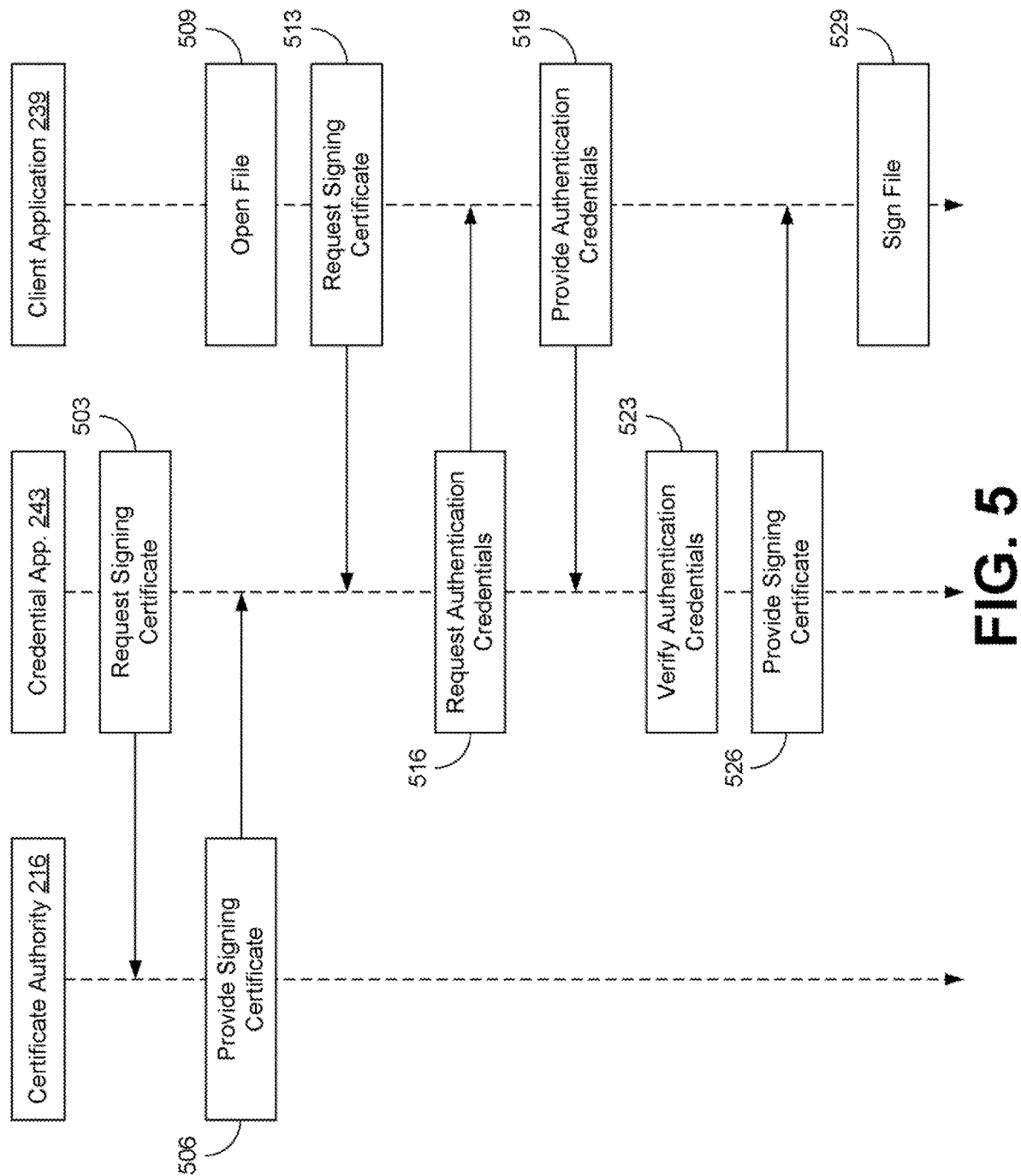
FIG. 5 is a sequence diagram illustrating one example of an implementation of the present disclosure within the network environment of FIG. 2

Referring next to FIG. 5, shown is a sequence diagram that provides one example of the interaction between the various components of the network environment 200. The sequence diagram of FIG. 5 provides merely an example of a possible implementation of the present disclosure. As an alternative, the flowchart of FIG. 5 can be viewed as depicting an example of elements of a method implemented in the network environment 200 according to one or more embodiments.

Beginning at step 503, the credential application 243 can request a certificate 233 for signing files 249 or other documents. For example, the credential application 243 may send a request for a certificate 133 in response to registration or enrollment of the client device 100 with the management service 219 or in response to installation of the client application 239. Accordingly, the request can include an identifier of a user account 225.

Then at step 506, the certificate authority 216 can provide the certificate 233 in response to the request. For example, the certificate authority 216 may select a certificate 233 associated with the user account 225 identified in the request and return the certificate 233 to the credential application 243.

Subsequently at step 509, the client application 239 can open a file 249. For example, a user of the client device 100 may attempt to open a document attached to an email. As another example, the user of the client device 100 may attempt to open a file 249 stored in a file hosting service or similar content locker.

Proceeding to step 513, the client application 239 can then request the certificate 233 from the credential application 243. The request for the certificate may occur in response to a user interaction with a user interface element 106 that allows for a user to electronically sign the file 249.

Then at step 516, the credential application 243 can optionally request authentication credentials 236 from the client application 239 to verify that the user of the client application 239 or client device 100 is authorized to sign the file 249 using the certificate 233.

Next at step 519, the client application 239 provides the requested authentication credentials 236. For example, the client application 239 may, in response to the request at step 516, cause a prompt 109 to be rendered on the display 103 of the client device 100. The user could then enter authentication credentials 236 (e.g., a password, PIN, one-time password token, etc.), which can be provided to the credential application 243.

Proceeding to step 523, the credential application 243 can verify the authentication credentials 236 received from the client application 239. For example, the credential application 243 could compare the received authentication credentials 236 with the authentication credentials 236 stored in association with the certificate 233. If the two sets of authentication credentials 236 match, then the user of the client device 100 is permitted to utilize the certificate 233. As another example, if the authentication credentials 236 received from the client application 239 are able to successfully decrypt the certificate (e.g., where the certificate is encrypted within a PKCS #12 container), then the credential application 243 could determine that the user of the client device 100 is permitted to utilize the certificate 233.

Then at step 526, the credential application 243 can provide the certificate 233 to the client application 239. The certificate 233 can be provided in response to a determination at step 523 that the authentication credentials 236 provided by the client application 239 match the authentication credentials 236 associated with the certificate 233.

Next at step 529, the client application 239 can electronically sign the file 249 using the certificate 233 received from the credential application 243. For example, the client application 239 could insert a graphical representation of the user's signature into the file 249. Further, the client application 239 could use the certificate 233 to generate a cryptographic signature of the file 249 and include information about the certificate 233 used to generate the cryptographic signature of the file 249 in the file 249. This additional information could include a fingerprint or similar unique identifier of the certificate 233, the date and time that the cryptographic signature for the file 249 was generated, and potentially other information.

In some implementations, the client application 239 may first convert the file 249 from a first file type to a second file type prior to signing the file 249. For example, some types of files (e.g., a portable document file (PDF)) may natively support electronic or digital signatures, while other file types (e.g., plaintext files) may not. In such an example, the client application 239 could first convert the plaintext file 249 into a PDF file 249 prior to signing the file 249.

Figure 6:
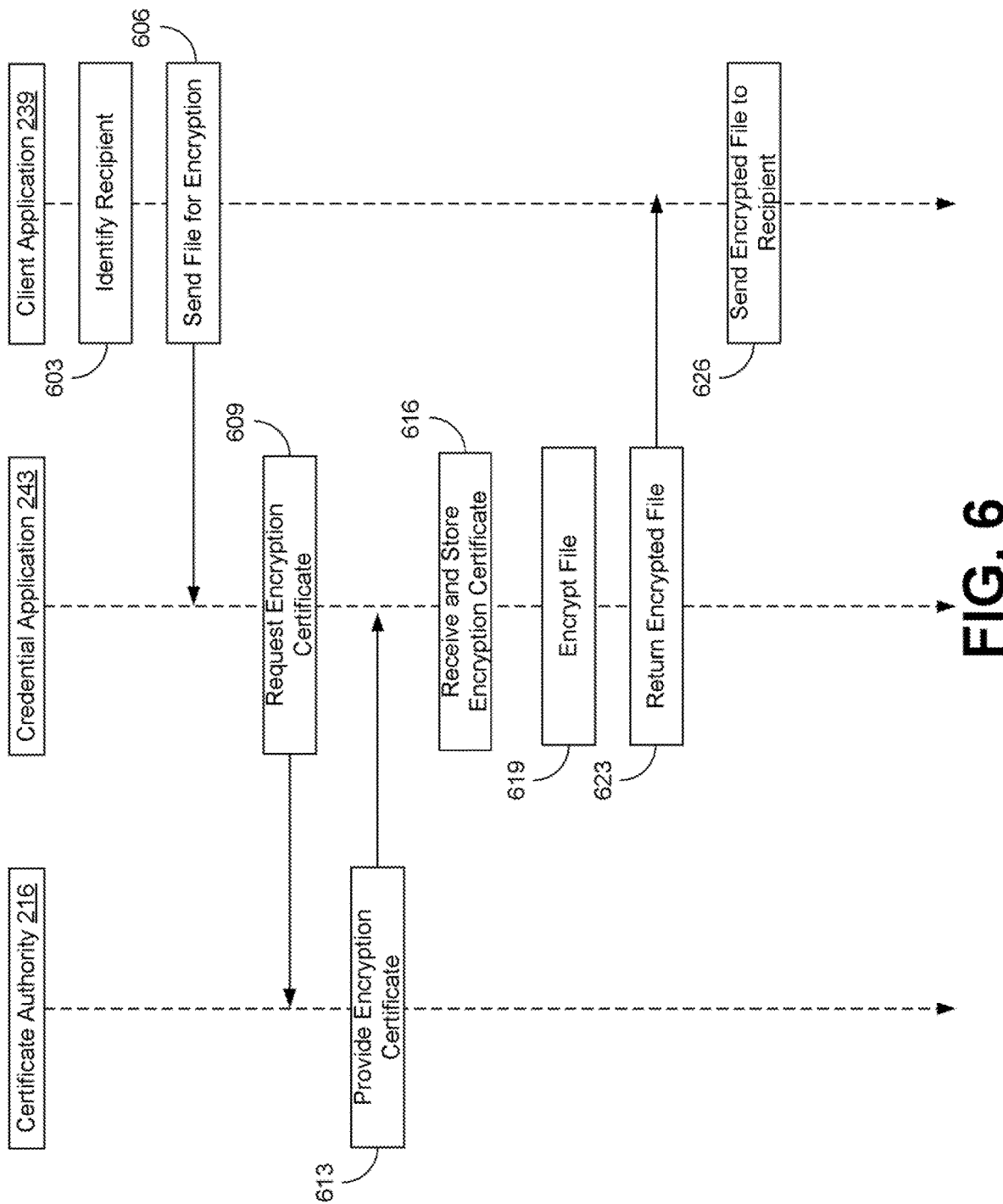
FIG. 6 is a sequence diagram illustrating one example of an implementation of the present disclosure within the network environment of FIG. 2

Referring next to FIG. 6, shown is a sequence diagram that provides one example of the interaction between the various components of the network environment 200. The sequence diagram of FIG. 6 provides merely an example of a possible implementation of the present disclosure. As an alternative, the flowchart of FIG. 6 can be viewed as depicting an example of elements of a method implemented in the network environment 200 according to one or more embodiments.

Beginning at step 603, the client application 239 identifies a recipient for the file 249. For example, an email client might identify a recipient based off of an email address in the "To" or "CC" fields of an email. As another example, a chat or messaging application might identify a recipient based off of a username or similar identifier. In some instances, the client application 239 may provide a mechanism for a user to manually identify the recipient.

Then at step 606, the client application sends the file 249 to the credential application 243 for encryption. The request can include both a copy of the file 249 and the identifiers of the recipients. In some instances, the request may also specify encryption preferences, such as a minimum key-strength, a preferred encryption algorithm, etc.

Next at step 609, the credential application 243 can request a copy of an encryption certificate 233 from the certificate authority 216. For example, the credential application 243 can send the user identifiers received from the client application 239 to the certificate authority 216.

Proceeding to step 613, the certificate authority provides the certificates 233 associated with the identified user accounts 225 in response to the request from the credential application 243.

Moving to step 616, the credential application 243 receives the certificates 233. In some implementations, the certificates 233 may be locally stored on the client device 100 (e.g., in the client data store 246) for future use. In other implementations, the certificates 233 may be deleted after subsequent encryption operations are performed in order to provide an extra degree of security should the client device 100 be compromised.

Then at step 619, the credential application 243 can encrypt the file 249 using the certificate 233 associated with the recipient. For example, if the certificate 233 specifies a user's public encryption key, the public encryption key specified in the certificate could be used to encrypt the file 249. In some implementations, the file 249 may also be signed either before and/or after the file 249 is encrypted. Signing the file 249 and obtaining the requisite signing certificates 233 may occur utilizing one of the approaches described previously with respect to FIGS. 3-5.

Next at step 623, the credential application 243 can return the encrypted file 249 to the client application 239. In some implementations, the credential application 243 may securely delete the unencrypted version of the file 249 from the memory of the client device 100. This may be done, for example, to minimize the chances of accidental disclosure of sensitive information contained in the file 249.

Then at step 626, the client application 239 can share or send the encrypted file 249 with the recipient(s). For example, an email application could attach and send the encrypted file 249 to the specified recipients. As another example, a chat or messaging application could embed the encrypted file 249 in a message sent to another user.

Although the certificate authority 216, the management service 219, the derived credentials service 221, the client application 239, the multifactor authentication application 241, the management agent 242, and the credential applications 243, and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagrams show examples of the functionality and operation of various implementations of portions of components described in this application. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagrams show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system, comprising:
a computing device comprising a processor and a memory;
machine-readable instructions stored in the memory that, when executed by the processor, cause the computing device to at least:
send a request to a certificate authority for a signing certificate;
receive the signing certificate from the certificate authority, the signing certificate being encrypted using an authentication certificate;
store the signing certificate in the memory;
receive a file from a client application executed by the processor of the computing device;
verify that a first authentication credential from the client application matches a second authentication credential associated with the signing certificate;
decrypt the signing certificate using the first authentication credential;
in an instance in which the first authentication credential matches the second authentication credential, sign the file with the signing certificate to create a signed file;
insert information used to generate a cryptographic signature for the file into the signed file, the information comprising a fingerprint of the signing certificate; and
return the signed file to the client application.

2. The system of claim 1, wherein the machine readable instructions further cause the computing device to at least:
request the first authentication credential from the client application in response to receipt of the file;
receive the first authentication credential from the client application; and
wherein the machine readable instructions cause the computing device to sign the file with the signing certificate in response to a verification that the first authentication credential matches the second authentication credential.

3. The system of claim 2, wherein the signing certificate is encrypted using the authentication certificate according to a version of a Public-Key Cryptography (PKCS) standard.

4. The system of claim 2, wherein the first authentication credential is a password.

5. The system of claim 1, wherein the machine readable instructions further cause the computing device to at least:
determine that the signing certificate is absent from the memory of the computing device; and
the request to the certificate authority is sent in response to a determination that the signing certificate is absent from the memory of the computing device.

6. The system of claim 1, wherein the machine readable instructions further cause the computing device to at least:
convert the file from a first file type into a second file type; and
the file is signed to generate the signed file in response to a conversion of the file from the first file type into the second file type.

7. The system of claim 1, wherein the signing certificate is derived from a user account credential.

8. A method, comprising:
sending, by a computing device, a request to a certificate authority for a signing certificate;
receiving, by the computing device, the signing certificate from the certificate authority, the signing certificate being encrypted using an authentication certificate;
storing, by the computing device, the signing certificate in a memory of the computing device;
receiving, by the computing device, a file from a client application executed by a processor of the computing device;
verifying, by the computing device, that a first authentication credential from the client application matches a second authentication credential associated with the signing certificate;
decrypting, by the computing device, the signing certificate using the first authentication credential;
in an instance in which the first authentication credential matches the second authentication credential, signing, by the computing device, the file with the signing certificate to create a signed file;
inserting, by the computing device, information used to generate a cryptographic signature for the file into the signed file, the information comprising a fingerprint of the signing certificate; and
returning, by the computing device, the signed file to the client application.

9. The method of claim 8, further comprising:
requesting, by the computing device, the first authentication credential from the client application in response to receipt of the file;
receiving, by the computing device, the first authentication credential from the client application; and
wherein signing the file with the signing certificate occurs in response to verifying that the first authentication credential matches the second authentication credential.

10. The method of claim 9, wherein the signing certificate is encrypted using the authentication certificate according to a version of a Public-Key Cryptography (PKCS) standard.

11. The method of claim 9, wherein the first authentication credential is a password.

12. The method of claim 8, further comprising:
determining, by the computing device, that the signing certificate is absent from the memory of the computing device; and
the request to the certificate authority is sent in response to determining that the signing certificate is absent from the memory of the computing device.

13. The method of claim 8, further comprising:
converting, by the computing device, the file from a first file type into a second file type; and
the file is signed to generate the signed file in response to converting the file from the first file type into the second file type.

14. The method of claim 8, wherein the signing certificate is derived from a user account credential.

15. A non-transitory, computer-readable medium comprising machine-readable instructions that, when executed by a processor of a computing device, cause the computing device to at least:
send a request to a certificate authority for a signing certificate;
receive the signing certificate from the certificate authority, the signing certificate being encrypted using an authentication certificate;
store the signing certificate in a memory of the computing device;
receive a file from a client application executed by the processor of the computing device;
verify that a first authentication credential from the client application matches a second authentication credential associated with the signing certificate;
decrypt the signing certificate using the first authentication credential;
in an instance in which the first authentication credential matches the second authentication credential, sign the file with the signing certificate to create a signed file;
insert information used to generate a cryptographic signature for the file into the signed file, the information comprising a fingerprint of the signing certificate; and
return the signed file to the client application.

16. The non-transitory, computer-readable medium of claim 15, wherein the machine readable instructions further cause the computing device to at least:
request the first authentication credential from the client application in response to receipt of the file;
receive the first authentication credential from the client application; and
wherein the machine readable instructions cause the computing device to sign the file with the signing certificate in response to a verification that the first authentication credential matches the second authentication credential.

17. The non-transitory, computer-readable medium of claim 16, wherein the signing certificate is encrypted using the authentication certificate according to a version of a Public-Key Cryptography (PKCS) standard.

18. The non-transitory, computer-readable medium of claim 16, wherein the first authentication credential is a password.

19. The non-transitory, computer-readable medium of claim 15, wherein the machine readable instructions further cause the computing device to at least:
determine that the signing certificate is absent from the memory of the computing device; and
the request to the certificate authority is sent in response to a determination that the signing certificate is absent from the memory of the computing device.

20. The non-transitory, computer-readable medium of claim 15, wherein the machine readable instructions further cause the computing device to at least:
convert the file from a first file type into a second file type; and
the file is signed to generate the signed file in response to a conversion of the file from the first file type into the second file type.

* * * * *